United States Patent [19]

Yuasa et al.

[11] Patent Number: 4,567,495

[45] Date of Patent: Jan. 28, 1986

[54] RECORD HEAD CLEANING DEVICE FOR IMAGE RECORDING APPARATUS

[75] Inventors: Kazuhiro Yuasa, Zama; Kenya Komada, Yokohama, both of Japan

[73] Assignee: Ricoh Company, Ltd., Tokyo, Japan

[21] Appl. No.: 477,463

[22] Filed: Mar. 21, 1983

[30] Foreign Application Priority Data

Mar. 30, 1982 [JP] Japan ................... 57-51710
Apr. 2, 1982 [JP] Japan ................... 57-55169

[51] Int. Cl.$^4$ ............................................. G02D 15/06
[52] U.S. Cl. .................. 346/153.1; 400/701
[58] Field of Search ............ 346/153.1, 155, 74.2, 346/74.5, 160, 139 C; 369/71; 118/70, 639, 652; 400/701; 360/110, 128

[56] References Cited

U.S. PATENT DOCUMENTS

| | | | |
|---|---|---|---|
| 3,987,491 | 10/1976 | Nelson | 346/74.2 |
| 4,038,026 | 7/1977 | Wada et al. | 432/60 |
| 4,322,734 | 3/1982 | Ebi et al. | 346/153.1 |
| 4,439,781 | 3/1984 | Yano | 346/153.1 |
| 4,456,238 | 6/1984 | Mizuma | 271/251 X |

FOREIGN PATENT DOCUMENTS 53-138337 12/1978 Japan ................... 346/153.1

*Primary Examiner*—E. A. Goldberg
*Assistant Examiner*—Fred L. Kampe
*Attorney, Agent, or Firm*—David G. Alexander

[57] ABSTRACT

A record head of an image recording apparatus is reciprocally tilted to suitably vary the contact condition between the surface of the record head and that of a recording medium, thereby removing toner particles which are momentarily stuck to the record head surface. To maintain styluses of the head unchanged in position, the reciprocation of the record head is effected for the interval between the end of a recording cycle for one page and the start of the next recording cycle for another page, which interval has no influence on the image recording operation.

6 Claims, 10 Drawing Figures

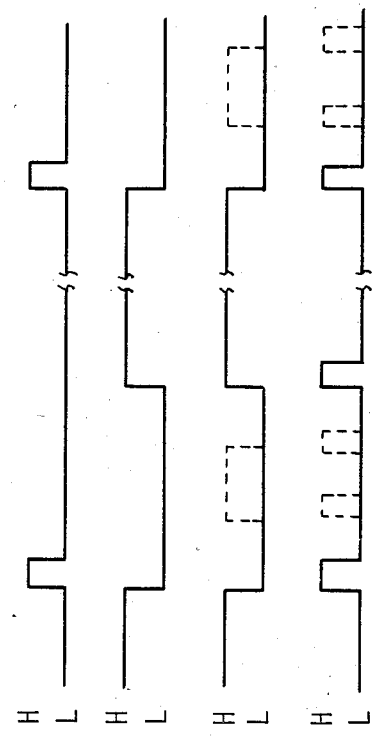
Fig. 5a  PAGE END
Fig. 5b  PRINT READY
Fig. 5c  ACTUATOR 1
Fig. 5d  ACTUATOR 2

RECORD HEAD CLEANING DEVICE FOR IMAGE RECORDING APPARATUS

BACKGROUND OF THE INVENTION

The present invention relates to an electrostatic image recording apparatus of the image transfer type and, more particularly, to a record head cleaning device for use in such an image recording apparatus.

In a prior art transfer type electrostatic image recording apparatus, a recording medium takes the form of an endless belt which comprises a dielectric layer, a conductive layer and a base layer. The belt is fed in the subscan direction while being charged uniformly throughout its surface. A record head having an array of styluses arranged in the main scan direction to cover one line is supplied with a voltage representing digital image data, thereby dissipating or reducing the charge on the belt surface. The resulting latent image on the belt is developed by a toner and then transferred to an ordinary sheet of paper. The toner image on the paper sheet is fixed permanently thereon at a fixing station. In this type of recording apparatus, the surface of the belt is usually cleaned after the image transfer to become reusable for another recording cycle.

In practice, however, it is impossible to perfectly remove toner particles remaining on the belt after the transfer by means of a cleaner. The residual toner particles tend to accumulate on the operating surface of the record head to thereby impair the discharging characteristic of the styluses. This will result in poor quality of reproduced images or smearing in background areas.

SUMMARY OF THE INVENTION

It is an object of the present invention to provide a record head cleaning device for an image recording apparatus of the type described which prevents toner particles from accumulating on a record head.

It is another object of the present invention to provide a generally improved record head cleaning device for an image recording apparatus of the type described.

A device for cleaning a record head having styluses embodying the present invention is applicable to a transfer type image recording apparatus which includes a recording medium. A drive source generates a driving force. A transmission mechanism transforms the driving force into a pivotal motion and applies the pivotal motion to the record head. Means is provided for positioning the styluses of the record head relative to a record surface of the recording medium.

In accordance with the present invention, a record head of an image recording apparatus is reciprocally tilted to suitably vary the contact condition between the surface of the record head and that of a recording medium, thereby removing toner particles which are momentarily stuck to the record head surface. To maintain styluses of the head unchanged in position, the reciprocation of the record head is effected for the interval between the end of a recording cycle for one page and the start of the next recording cycle for another page, which interval has no influence on the image recording operation.

The above and other objects, features and advantages of the present invention will become apparent from the following detailed description taken with the accompanying drawings.

BRIEF DESCRIPTION OF THE DRAWINGS

FIGS. 5a–5d are timing charts showing various signals which appear to cause the record head to tilt during an interval between successive recording operations.

DESCRIPTION OF THE PREFERRED EMBODIMENTS

While the record head cleaning device for an image recording apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
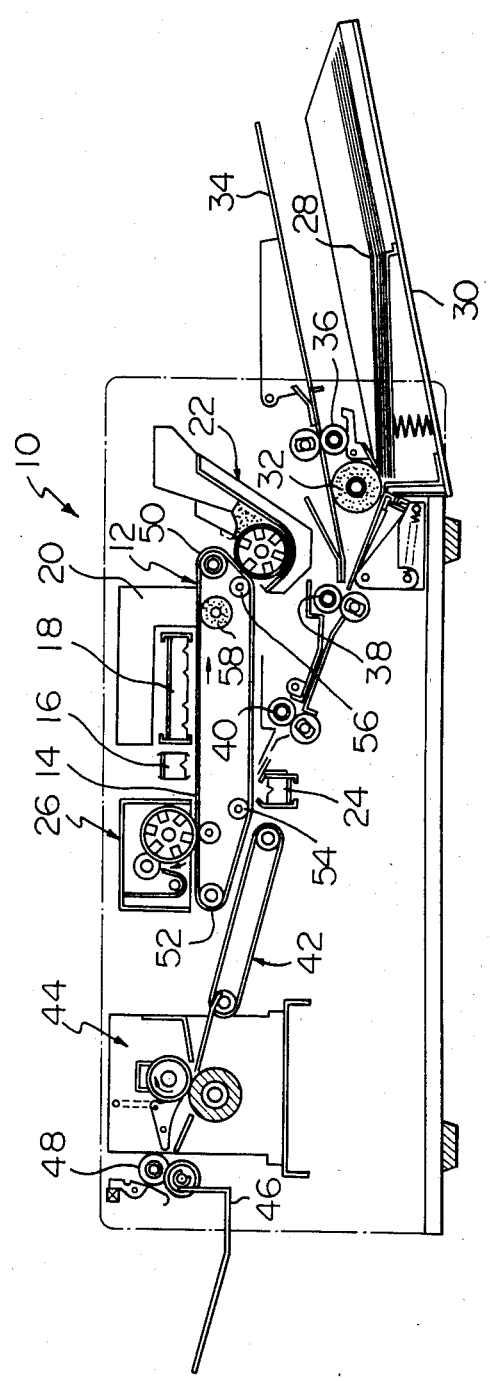
FIG. 1 is a front view of an image recording apparatus of the electrostatic transfer type to which the present invention is applicable.

Referring to FIG. 1 of the drawings, a transfer type electrostatic recording apparatus to which the present invention is applicable is shown and generally designated by the reference numeral 10. The apparatus 10 includes a belt unit 12 which comprises a recording medium 14 in the form of an endless belt. The belt 14 is uniformly charged by an AC charger 16 for charge dissipation and a DC charger 18 for charge deposition in a well known manner. A record head 20 carries an array of styluses which extends in the main scan direction with respect to the surface of the belt 14, which is fed in the subscan direction. A developing unit 22 is detachably mounted on a housing (not shown) of the apparatus 10. These various elements and units 16–22 constitute an electrostatic recording process system in combination with a transfer charger 24 and a cleaning unit 26. A sheet 28 is fed from a sheet cassette 30 by a feed roller 32 or a sheet laid on a table 34 by hand is fed therefrom by a feed roller 36, each to a transfer station at such a timing that the leading end of the sheet coincides with that of an image area developed on the belt 14. The feed roller 32 or 36, a registration roller 38 and a feed roller 40 for image transfer constitute a sheet feed system. A belt mechanism 42 is adapted to convey the sheet which has undergone image transfer. A fixing unit 44 is located past of the belt mechanism 42 to permanently fix an image on the sheet. The sheet coming out from the fixing unit 44 is fed to a tray 46 by a discharge roller 48. The belt 14 runs around a drive roller 50, a tension roller 52 and idle rollers 54 and 56. The reference numeral 58 designates a backup roller for the record head 20.

Figure 2:
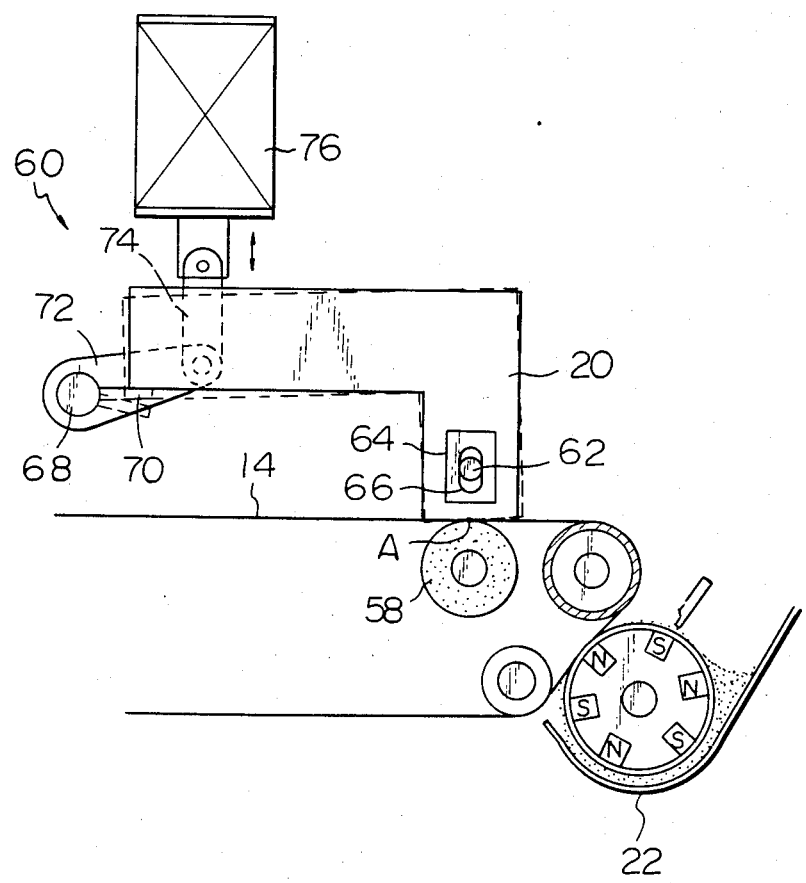
FIG. 2 is a front view of head tilting means which represents a record head cleaning device embodying the present invention.

The record head cleaning device of the present invention is shown in FIG. 2. The device comprises means 60 for reciprocally tilting the head 20. As shown, the head 20 is generally L-shaped and has shafts 62 which extend from opposite sides of one end of the head 20 away from each other. The head 20 is pivotally mounted between stationary brackets 64 through the shafts 62 in such a manner that when the head 20 is tilted to the position indicated by a dotted line in FIG. 2, the styluses A on the head 20 remain unchanged in position. Each bracket 64 is formed with an elongate slot 66 which permits such a tilt of the head 20 in cooperation with the associated shaft 62 on the head 20. A shaft 68 extends transverse to the running direction of the belt 14 and is journalled to rigid frame members of the apparatus 10. A pin 70 is mounted on the shaft 68 to bear the other end of the head 20. A lever 72 is also mounted on the shaft 68 and connected by a link member 74 to an output shaft of a solenoid operated actuator 76. When the actuator 76 is turned on and off, its output shaft will move the pin 70 up and down via the link 74, lever 72, and shaft 68 thereby causing the head 20 to oscillate between the upright and tilted positions.

Figure 3A:
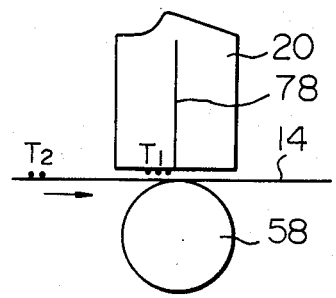
FIGS. 3a–3c are diagrams schematically showing sequential positions of the recording head in operation and adhesion of toner particles thereto.
Figure 3B:
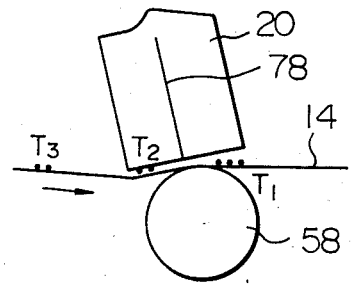
Figure 3C:
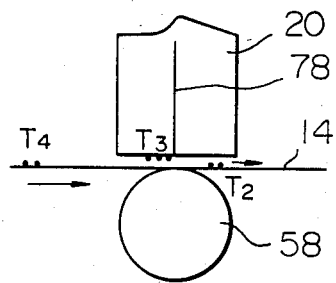

In operation, while the head 20 is in the usual upright position shown in FIG. 3a, toner particles $T_1$ conveyed by the belt 14 stick to the bottom of the head 20. As the head 20 is tilted to the position shown in FIG. 3b by the drive linkage described, the toner particles $T_1$ stuck to the head 20 escape therefrom due to a change in the contact angle of the belt 14 and head 20. Even when the head 20 is inclined, toner particles $T_2$ stick to the head 20 although different in area from the case of the upright head position. Still, as the head 20 is returned from the inclined position to the upright, the toner particles $T_2$ escape from the head 20 due to a change in the contact condition between the belt 14 and the head 20. Such a tilting action of the head 20 is repeated so that toner particles $T_3$, $T_4$ etc. repeatedly become struck to and removed from the head 20, thereby effectively preventing toner particles from accumulating on the head 20. The reference numeral 78 in FIGS. 3a–3c designates the stylus array.

Figure 4:
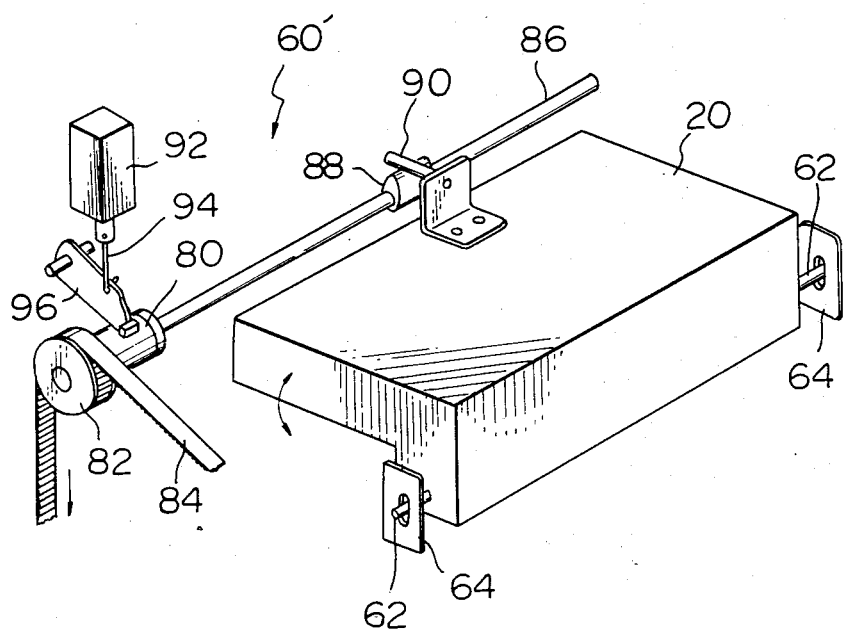
FIG. 4 is a perspective view of head tilting means in accordance with another embodiment of the present invention.

Referring to FIG. 4, an alternative embodiment of the head tilting means is illustrated. The tilting means 60' includes a half-rotation clutch 80 which is operatively connected to a drive source (not shown) by a pulley 82 and a belt 84. The clutch 80 has an output shaft 86 which carries a contoured cam 88 therewith. A pin 90 extends from the head 20 to serve as a follower in association with the cam 88. When an actuator 92 is turned on for a moment to retract its output shaft, a pawl 96 associated with the clutch 80 is pulled upwardly through a link 94. This releases the clutch 80 and allows it to rotate one-half of a full rotation which brings the head 20 to the tilted position. Another half rotation of the clutch 84 moves the head 20 back to the upright position.

The embodiments described above commonly employ mechanical means for reciprocating the head 20 between the upright and tilted positions. This kind of construction fails to practically eliminate slight dislocation of the stylus array relative to the belt surface due to the design situation, wear of the movable members, etc. Should the styluses be shifted relative to the belt surface during reciprocation of the head, the resulting image would appear expanded or contracted in the subscan direction. Any irregularity in the reciprocation of the head would degrade the reproduced images.

In accordance with the present invention, the head 20 is tilted once or a plurality of times for every interval between the end of a recording cycle for one page and the start of a recording cycle for the next page or between the end of a plurality of successive recording cycles and the start of another series of recording cycles.

In FIGS. 5a–5d, there are shown a relative timing between various signals which appear to tilt the head 20 after each recording cycle by way of example. FIG. 5a shows a PAGE END signal which becomes high level at the end of a recording cycle for one page. FIG. 5b shows a PRINT READY signal which becomes high level during recording. FIG. 5c shows an ACTUATOR 1 signal which is a strobe signal for triggering the actuator 76 of FIG. 2. FIG. 5d shows an ACTUATOR 2 signal which is a strobe signal for triggering the actuator 92 of FIG. 4.

As the image recording apparatus in a facsimile transceiver, for example, receives the PAGE END signal shown in FIG. 5a, a controller associated with the apparatus (not shown) makes the PRINT READY signal low level to terminate the recording operation. Simultaneously, in the embodiment of FIG. 2, the controller makes the strobe signal ACTUATOR 1 low level which has triggered the actuator 76 to maintain the head in the upright position. This inclines the head 20 during the interval between the recording cycles. In response to the start of the next recording cycle for another page, the PRINT READY signal becomes high level while, at the same time, the strobe signal ACTUATOR 1 is made high level to return the head 20 to the upright position. In the embodiment shown in FIG. 4, the controller supplies the actuator 92 with a strobe pulse ACTUATOR 2 when it has made the PRINT READY signal low level. The strobe pulse momentarily triggers the actuator 92 to tilt the head 20 during the interval between the recording cycles. As soon as the PRINT READY signal becomes high level at the start of the next recording cycle for another page, another strobe pulse ACTUATOR 2 is fed to the actuator 92 to bring it back to the upright position. Alternatively, the head 20 may be reciprocated once or twice for each interval as represented by a dotted line in FIG. 5c or in FIG. 5d.

Various modifications will become possible for those skilled in the art after receiving the teachings of the present disclosure without departing from the scope thereof. For example, the belt 14 may be provided with a cleaning region made of a material which facilitates separation of toner particles from the head 20, in order to implement a more effective measure against accumulation of toner particles on the head 20.

What is claimed is:

1. A device for cleaning a record head having a stylus means in a transfer type image recording apparatus which includes a rotating recording medium having an endless recording surface and means for developing and cleaning the recording surface, comprising:

a drive source for generating a driving force;
a transmission mechanism for transforming the driving force into a pivotal motion and applying the pivotal motion to the record head;
means for positioning the stylus means of the record head relative to the recording surface of the recording medium; and
operation control means for controlling the timing for the transmission of the pivotal motion to the record head such that an angle of the stylus means relative to the recording medium is periodically changed during intervals between recording cycles of the recording apparatus with no substantial toner layer between the stylus means and the surface of the recording medium thereby residual toner particles from the recording medium stuck on the record head are removed from the record head solely the rotating recording medium.

2. A device as claimed in claim 1, in which the positioning means comprises a shaft extending from each side of the record head in a direction perpendicular to an intended direction of travel of the recording medium, and a bracket securely connected to the recording apparatus and formed with an elongate slot in which adjacent one of the shafts is engaged.

3. A device as claimed in claim 1, in which the drive source comprises a solenoid and an actuator driven by said solenoid in a reciprocal movement.

4. A device as claimed in claim 3, in which the transmission mechanism comprises a pin which is operatively connected to the record head and pivotally moved in unison with the reciprocation of the actuator.

5. A device as claimed in claim 1, in which the transmission mechanism comprises a shaft rotated by the driving force, a cam rigidly mounted on said shaft, and a pin studded on the record head and engaged with the contour of said cam to impart the pivotal motion to the record head.

6. A device as claimed in claim 5, in which the transmission mechanism further comprises a clutch mechanism for transmitting driving force to the shaft.

* * * * *